United States Patent [19]
Winter

[11] Patent Number: 6,061,859
[45] Date of Patent: May 16, 2000

[54] SELF RELEASING HOLD-DOWN MECHANISM FOR DOCK LEVELER

[75] Inventor: Bruce R. Winter, Muskego, Wis.

[73] Assignee: Overhead Door Corporation, Dallas, Tex.

[21] Appl. No.: 09/048,142

[22] Filed: Mar. 25, 1998

[51] Int. Cl.$^7$ ..................................................... E01D 1/00
[52] U.S. Cl. ............................................. 14/71.3; 14/69.5
[58] Field of Search ................................... 14/69.5, 71.1, 14/71.3, 71.5

[56] References Cited

U.S. PATENT DOCUMENTS

| | | | |
|---|---|---|---|
| 3,579,696 | 5/1971 | Hecker, Jr. et al. | 14/71 |
| 3,646,627 | 3/1972 | Potter | 14/71 |
| 3,699,601 | 10/1972 | Hecker, Jr. et al. | 14/71 |
| 3,877,102 | 4/1975 | Artzberger | 14/71 |
| 3,967,337 | 7/1976 | Artzberger | 14/71.7 |
| 3,997,932 | 12/1976 | Artzberger | 14/71.3 |
| 4,531,248 | 7/1985 | Swessel et al. | 14/71.3 |

*Primary Examiner*—Eileen Dunn Lillis
*Assistant Examiner*—Gary S. Hartmann
*Attorney, Agent, or Firm*—Akin, Gump, Strauss, Hauer & Feld, LLP

[57] ABSTRACT

A self releasing hold-down device for a dock leveler having a ramp mounted for pivotal movement about a hinge axis between a stored position and a working position includes an elongates ratchet bar engageable with a pawl mounted on a body connected to a rod which is anchored at one end to the leveler frame. One end of the rod includes a retainer and release pin member mounted thereon and whose position is adjustable by a nut threadedly engaged with the rod. A coil spring is sleeved over the rod and engageable with the retainer and release pin member. The body includes an elongated tube journalling the coil spring and a portion forming a recess for supporting the pawl. A release actuator is pivotally mounted on the body and is engageable by release pins on the retainer and release pin member in response to forces acting on the ramp to effect momentary release of the hold-down device. A manual release lever is operable, at will, to also effect release of the pawl from the ratchet bar.

14 Claims, 6 Drawing Sheets

SELF RELEASING HOLD-DOWN MECHANISM FOR DOCK LEVELER

FIELD OF THE INVENTION

The present invention pertains to a self releasing hold-down mechanism for a mechanical, self elevating dock leveler.

BACKGROUND

Dock levelers or so-called dockboards are widely used in conjunction with freight vehicle loading docks and the like to provide a continuous path between the loading dock and the loadbed of a vehicle. One widely used type of dock leveler comprises a generally planar ramp or deck member which is pivotally connected to a frame disposed in a pit or recess in a loading dock and moveable between a stored position substantially coplanar with the surface of the loading dock and an elevated position preparatory to engagement with the loadbed of a vehicle when it is situated in proximity to the loading dock. So-called mechanical dock levelers typically utilize one or more heavy duty springs which operate through a linkage to bias the dock leveler ramp from the stored position to an elevated position, including the engaged or working position of the dock leveler with respect to the vehicle loadbed. Many mechanical and other conventional dock levelers are also operable to descend to a position below the surface of the loading dock to engage vehicles which have a low loadbed height.

In mechanical dock levelers of the general type mentioned above a hold-down mechanism must be utilized to maintain the dock leveler in the stored position or a desired working position against pivotal movement, except within a very limited range, about its hinge axis during operation or storage. Conventional hold-down mechanisms may be manually released to allow changing the position of the ramp about its hinge axis. However, a problem associated with conventional dock leveler hold-down mechanisms has become more acute as vehicle suspension mechanisms have been developed, including pneumatic suspension systems, which allow substantial variation in height of the loadbed, depending on the weight of the load supported thereon. Pneumatic suspension systems, in particular, are subject to movement within a fairly wide range of loadbed positions during loading and unloading. Accordingly, a dock leveler ramp engaged with a loadbed which moves considerably during cargo loading and unloading operations will itself tend to move with the loadbed as a result of the dock leveler lip or deck extension part being directly engaged with the vehicle loadbed.

If the dock leveler ramp begins to elevate substantially, any compensating linkage associated with the hold-down mechanism may "bottom out" or reach a limit position wherein further movement of the ramp will result in considerable damage or failure of the hold-down mechanism. Consequently, there has been a substantial need to develop a hold-down mechanism which is self releasing beyond a certain load condition imposed thereon to prevent damage to the dock leveler or the hold-down mechanism, or both, when the hold-down mechanism compensating linkage has moved to a limit position. It is to these ends that the present invention has been developed.

SUMMARY OF THE INVENTION

The present invention provides an improved hold-down mechanism for a dock leveler or dockboard, particularly of the type which has a biasing mechanism tending to move the dock leveler ramp or board to an elevated position.

The present invention also provides an improved hold-down mechanism for a mechanical or spring biased dock leveler ramp which is self releasing to minimize risk of damage or failure of the hold-down mechanism or the ramp due to movement of the vehicle loadbed during loading and unloading operations, for example.

In accordance with an important aspect of the present invention a self releasing hold-down mechanism for a dock leveler ramp is characterized by an elongated ratchet bar, a pawl connected to a linkage which is engageable with the bar and a compensating mechanism associated with the pawl and the linkage to allow limited movement of the ratchet bar and the ramp, when engaged with a vehicle loadbed, for example. The self releasing hold-down mechanism is operable, however, at a limit position of movement of the ramp to release the ratchet bar and ramp to prevent damage to the ramp or the hold-down mechanism. Upon release of the hold-down mechanism, it is automatically reset and the self releasing feature again becomes operable if a limit position is reached of the ramp as a result of further movement of the loadbed or as a result of any other forces acting on the ramp tending to move it toward an elevated position.

In particular, the hold-down device of the present invention includes a ratchet bar and pawl mechanism wherein the pawl is engaged with a body member which is biased by a compensating or so called "float" spring to move in one direction against a tendency for the ramp to move toward an elevated position under the urging of forces exerted thereon by a vehicle loadbed. The hold-down mechanism also includes a member for releasing the ramp for movement, at will.

Those skilled in the art will further appreciate the advantages and features of the invention upon reading the detailed description which follows in conjunction with the drawing.

DESCRIPTION OF THE PREFERRED EMBODIMENTS

Figure 1:
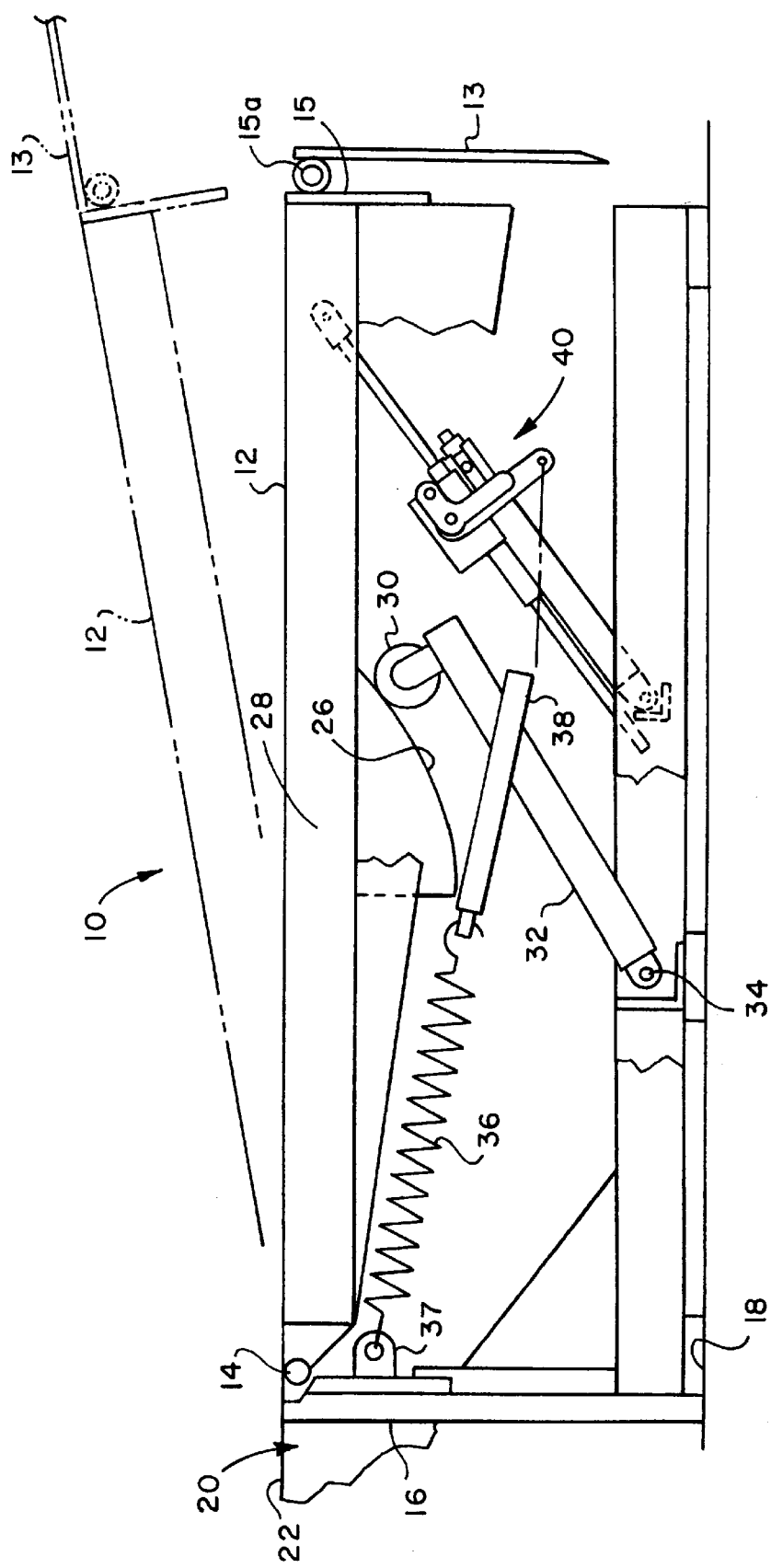
FIG. 1 is a side elevation, with parts partially broken away, of a spring biased dock leveler including the hold-down mechanism of the present invention.

In the description which follows like parts are marked throughout the specification and drawing with the same reference numerals, respectively. The drawing figures are not necessarily to scale and certain features may be shown in generalized or somewhat schematic form in the interest of clarity and conciseness.

Referring to FIG. 1, there is illustrated a dock leveler, generally designated by the numeral 10, of somewhat conventional construction, except for the invention hereof. The dock leveler 10 may, for example, be similar in some respects to those disclosed in U.S. Pat. Nos. 3,835,497 or 3,235,896, both being examples of a somewhat conventional mechanical dock leveler of the general type to which the invention pertains. Reference may be made to the above-mentioned patents for a more detailed description of some of the conventional features of the dock leveler, but which are not believed to be necessary for an understanding of the invention by those skilled in the art. Basically, however, the dock leveler 10 includes a generally planar ramp member 12 which is pivotally mounted at a pivot or hinge 14 to a support frame 16 which is mounted in a suitable recess 18 in a loading dock 20. The loading dock 20 includes a generally horizontal planar dock surface 22 which, in a stored position of the ramp 12, is substantially coplanar with the ramp. However, the ramp 12 is adapted to move about the pivot 14 to an elevated position, as indicated by the dashed lines in FIG. 1, preparatory to engagement with a loadbed 24 of a motor truck or other freight vehicle, for example. In this regard the ramp 12 includes an extension member or "lip" 13 which is pivotally connected to a distal end 15 of the ramp by suitable hinge means 15a for movement between a pendant position shown by the solid lines of FIG. 1, and an extended position by the dashed lines preparatory to engagement with the loadbed 24. Suitable mechanism, not shown, is operable to extend the lip 13 to the position indicated and to allow the lip to fall to its pendant position, when the ramp 12 is stored in the position shown in FIG. 1, to permit cross traffic along the dock surface 22. The ramp 12 is also operable to pivot downwardly from the stored position shown to other alternate positions, depending on the height of the loadbed 24 when it is disposed in proximity to the dock leveler 10 for loading and unloading cargo thereover.

The dock leveler 10 is of a so-called mechanical type and includes an arcuate cam 26 supported on a frame portion 28 of the ramp 12 and which is engageable with a cam roller 30 supported on an arm 32 which is pivotally mounted on the dock leveler frame 16 at a pivot 34. One or more substantial counterbalance springs 36 are operably connected at one end 37 to the frame 16 and at the opposite end to a link, which may be a yoke-like member 38, suitably connected to the arm 32 to exert a substantial biasing force which tends to pivot the arm 32 in a counterclockwise direction, viewing FIG. 1, to cause the cam roller 30 to roll along the cam 26 and elevate the ramp 12 to the alternate position shown, as well as, depending on the weight of any object on the ramp, to a substantial number of intermediate positions. The force of the spring or springs 36 is sufficient to cause the ramp 12 to pivot in a counterclockwise direction, viewing FIG. 1, if no additional weight is on the ramp and, consequently, it is necessary to provide a hold-down device or mechanism, generally designated by the numeral 40, interconnecting the ramp with the frame 16 to hold the ramp in a desired position, including the parked or stored position shown in FIG. 1.

Figure 2:
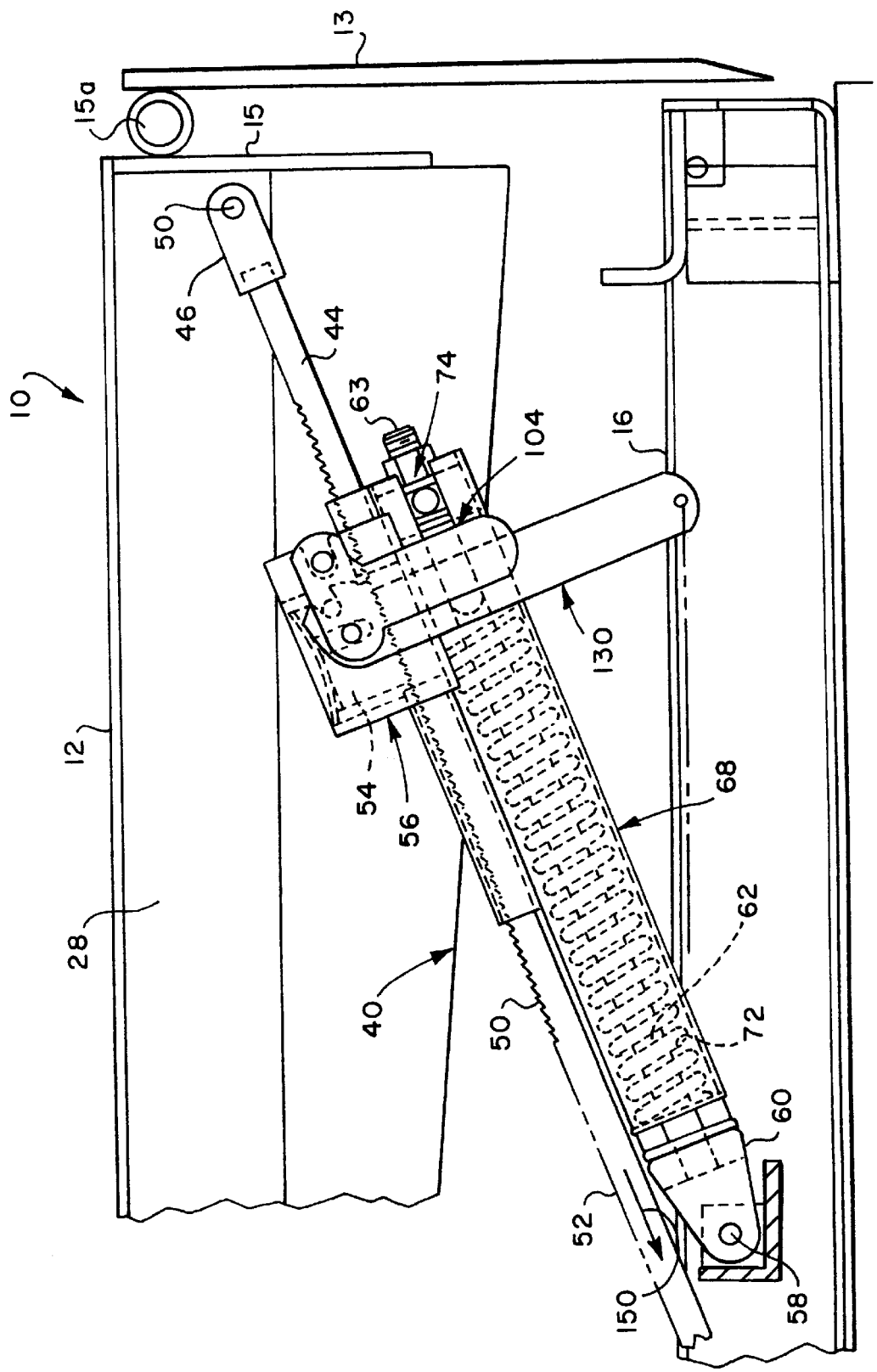
FIG. 2 is a detail elevation of one preferred embodiment the hold-down mechanism of the invention on a larger scale.

Referring briefly to FIG. 2, the hold-down device 40 includes an elongated bar 44 pivotally connected at one end 46 to the ramp frame 28 at a pivot 48. The bar 44 is of generally rectangular cross section and includes a series of ratchet teeth 50 disposed on an upper surface 52 of the bar. The ratchet teeth 50 are engageable with a suitable pawl 54 disposed on a body 56 of the hold-down device 40. The body 56 is supported for movement about a pivot 58 on the frame 16.

Figure 3:
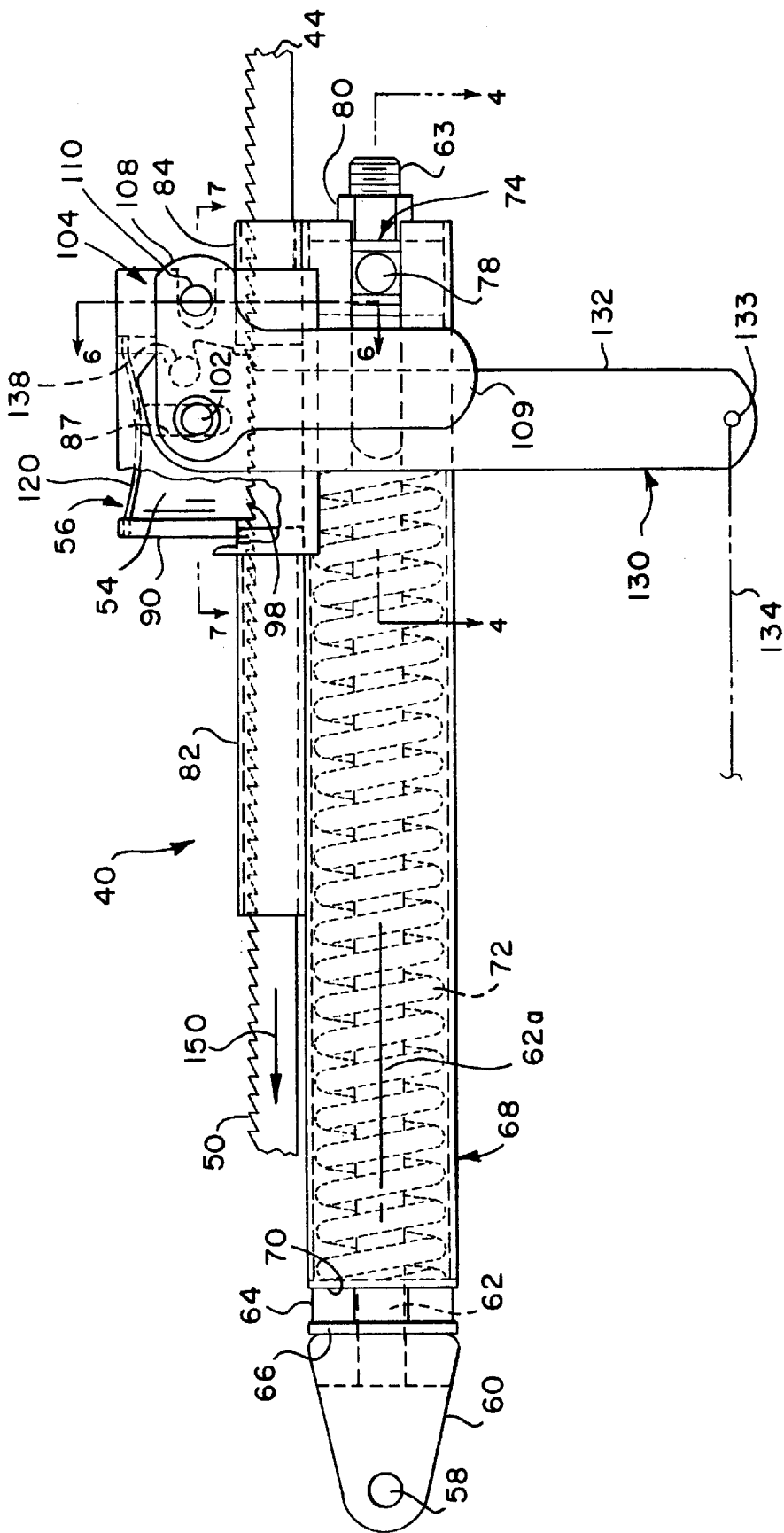
FIG. 3 is a longitudinal side elevation of the hold-down mechanism of FIG. 2 showing further details of the structural features.
Figure 4:
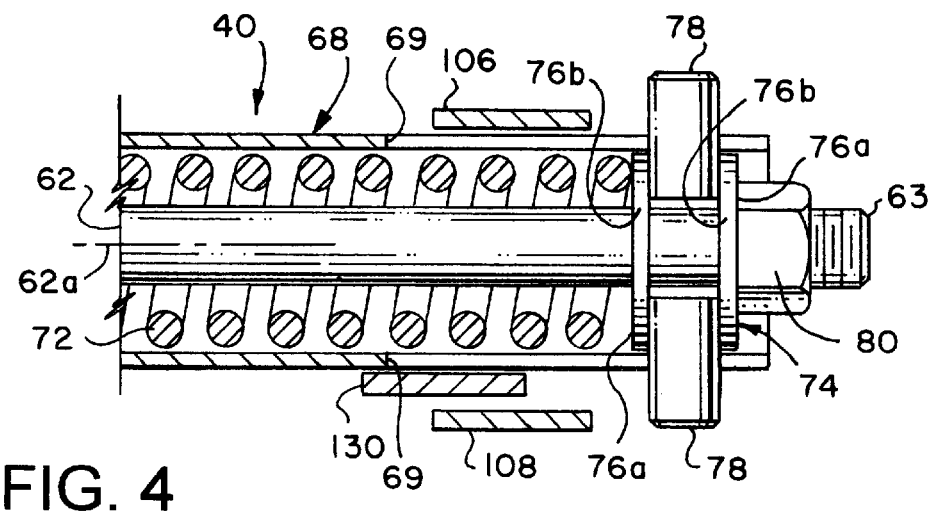
FIG. 4 is a detail section view taken along the line 4—4 of FIG. 3.
Figure 5:
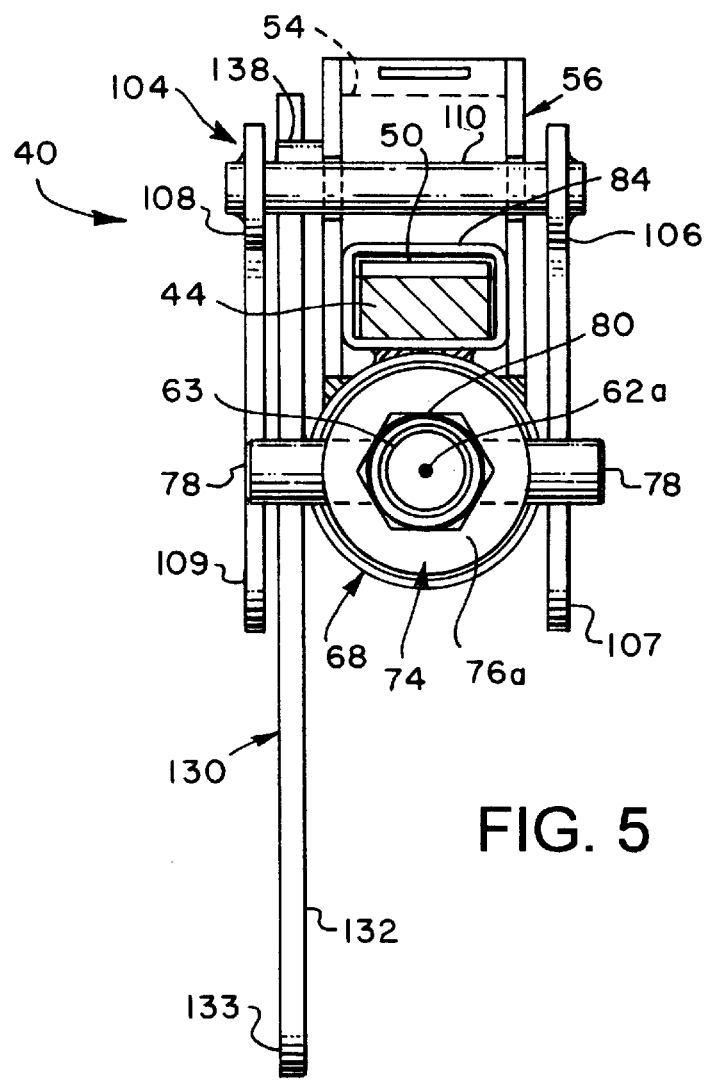
FIG. 5 is an end view of the hold-down mechanism shown in FIG. 3.

Referring now to FIGS. 3 through 7, further details of the self releasing hold-down device 40 are illustrated. Referring to FIGS. 3 and 5, in particular, the hold-down device 40 includes an anchor member including a clevis bracket 60 which is adapted to receive the pivot 58 for securing the device to the frame 16. An elongated rod 62 is connected at one end to the clevis bracket 60 and extends to a threaded distal end 63. A generally annular resilient cushion member 64 is sleeved over the rod 62 and is engageable with a cylindrical bearing plate 66 interposed the cushion member and the clevis bracket 60. An elongated cylindrical tube 68 is also sleeved over the rod 62 and is provided with a transverse end wall 70 having a suitable bore therein providing clearance for the rod.

As shown in FIG. 3, the tube 68 is disposed in engagement with the cushion member 64 at the end wall 70. A coil compression spring 72 is disposed within the tube 68 in sleeved relationship over the rod 62 and is retained within the tube in a predetermined degree of compression by a retainer and release pin member 74. The retainer member 74, see FIG. 4, comprises two spaced apart cylindrical plates 76a which are dimensioned to fit slidably within the tube 68 and opposed coaxial release pins 78 interposed the plates 76a. The members 76a and 78 may be welded together to form the member 74. The retainer and release pin member 74 is retained on the rod 62 by a threaded hexhead nut 80 whose position on the rod end 63 may be altered to adjust the compression of the spring 72 and the nominal working position of the release pins 78. The rod 62 extends through clearance bores 76b in the plates 76a, see FIG. 4. As shown in FIG. 4, the tube 68 has opposed, aligned longitudinal slots 69 formed therein for receiving the opposed pins 78 of the retainer member 74 to allow translation of the tube relative to the release pins 78, axially with respect to the longitudinal central axis 62a of rod 62 and tube 68.

Referring further to FIGS. 3, 5, 6 and 7, the body 56 of the hold-down device 40 includes the tube 68 which is suitably secured, such as by welding, to two, aligned and spaced apart rectangular cross section tubular guides 82 and 84 which are mounted on one side of the tube 68 and are adapted to receive the ratchet bar 44 slidably disposed therein.

Figure 7:
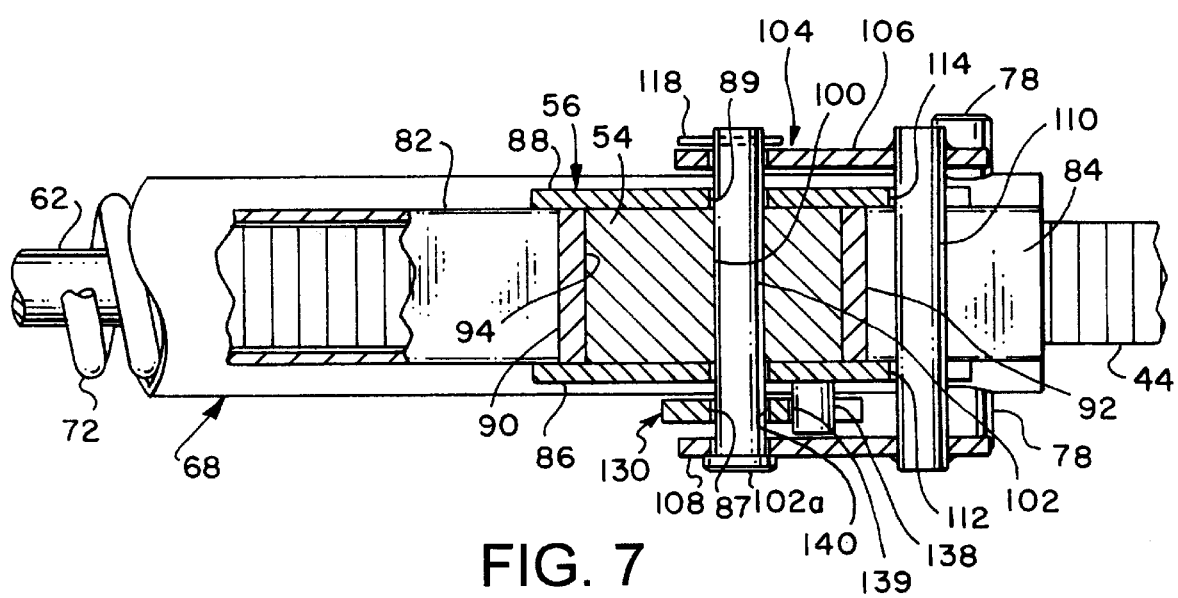
FIG. 7 is a detail section view taken along the line 7—7 of FIG. 3.

Interposed the tubes 82 and 84 are spaced apart wall parts 86 and 88 which, together with opposed end wall parts 90 and 92, see FIG. 7, form a generally rectangular shaped recess 94 for receiving the pawl 54 which is characterized by a rectangular block shaped member, FIGS. 3 and 7, slidably disposed in the recess and provided with a set of ratchet teeth 98 formed thereon and engageable with the ratchet teeth 50 on the bar 44. The sidewall parts 86 and 88 and the endwall parts 90 and 92 may be secured together and to the tube 68 by welding to form the body 56. The pawl 54 is also provided with a transverse bore 100, FIG. 7, which is adapted to be aligned with elongated slots 87 and 89 formed in the sidewall parts 86 and 88, respectively. As shown in FIGS. 3 and 7, the slots 87, 89 and the bore 100 are adapted to receive an actuating pin 102 extending therethrough and connected to a pawl release actuator 104. Release actuator 104 comprises two spaced apart members 106 and 108 which have respective depending leg portions 107 and 109, see FIG. 5 also, and a retaining or pivot pin 110 extending therebetween and secured to the members 106 and 108 in a suitable manner, such as by welding. The pivot pin 110 is fitted in opposed open ended slots 112 and 114 formed in the side wall parts 86 and 88, respectively. The pin 102 includes a head 102a and is releasably connected to the release actuator 104 by a suitable removable retaining pin 118, as shown in FIG. 7. The pin 102 extends through suitable aligned bores formed in the arm members 106 and 108 and spaced from the pivot pin 110.

Figure 6:
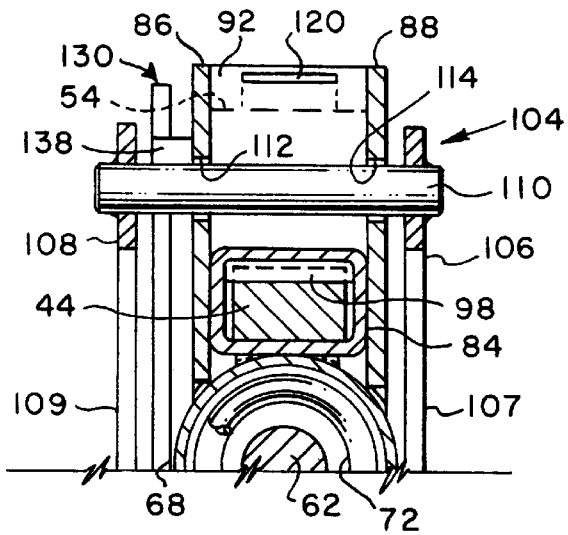
FIG. 6 is a section view taken along the line 6—6 of FIG. 3.

As indicated in FIGS. 3 through 5, the depending leg portions 107 and 109 of the members 106 and 108 are operable to be engaged by the opposed release pins 78, respectively, to effect pivotal movement of the release actuator 104 about the central axis of the pin 110 so as to cause the pawl 54 to move upward in the recess 94, viewing FIGS. 3, 5 and 6, to disengage from the ratchet bar 44. The pawl 54 may be biased into engagement with the bar 44 by a suitable leaf spring 120, for example, supported on the body 56.

Referring further to FIGS. 3 through 7, the hold-down device 40 is also provided with a release lever 130 which is supported on the body 56 and includes a depending arm portion 132 adapted to be connected at its distal end 133 to a pull cable or the like 134, FIG. 3. The pull cable 134 may be trained through a suitable port formed in the deck 12, not shown, or otherwise routed to a point wherein personnel operating the dock leveler 10 may grasp a pull ring or the like connected to the cable 134 to effect release of the pawl 54 from engagement with the ratchet bar 44, at will. The release lever 130 is mounted for pivotal movement on a pin 138, FIGS. 3 and 7, which is in registration with the lever at slot 139, FIG. 7. The pin 138 is suitably mounted on sidewall part 86. Lever 130 is also provided with a suitable bore 140 formed therein through which the pin 102 projects in close fitting relationship to the lever. Accordingly, viewing FIG. 3, if the release lever 130 is rotated in a clockwise direction about pin 138, the release actuator 104 will also be rotated about the axis of the pin 110 and the pawl 96 will move upward in the recess 54 to disengage from the ratchet bar 44.

The operation of the self releasing hold-down mechanism, or device 40, in conjunction with the dock leveler 10 is believed to be readily understandable to those skilled in the art. However, briefly, when the dock leveler ramp 12 is to be rotated from the stored position shown in FIG. 1 to an elevated position, preparatory to engaging a loadbed 24, the release lever 130 is manually actuated to cause the pawl 54 to disengage from the ratchet bar 44 thereby allowing the springs 36 to urge the ramp 12 to pivot in a counterclockwise direction, viewing FIG. 1, to or through the alternate position shown.

Prior to operation of the dock leveler 10, the position of the nut 80 has been adjusted to provide a predetermined compression on the spring 72 thereby biasing the body 56 at least lightly in a direction to engage the cushion member 64. The manual release lever 130 is normally actuated for a sufficient length of time to allow the ratchet bar 44 to move with the pivotal movement of the ramp 12 to the alternate position shown in FIG. 1, whereupon the cable 134 is released to allow the lever 130 and the pawl 54 to move back to the position shown in FIG. 3 wherein the pawl returns to engagement with the ratchet bar 44 and under the urging of spring 120. One or more persons may then walk out onto the ramp 12 to provide a sufficient force to move the ramp downward toward engagement of the extension or lip member 13 with the loadbed 24. The yieldable support arrangement of the pawl 96 and the configuration of the ratchet teeth 98 and 50 are such as to permit movement of the ratchet bar 44 with respect to the pawl 54 in a direction as indicated by the arrow 150 in FIGS. 2 and 3.

Once the ramp 12 and/or the extension lip 13 is engaged with the loadbed and the hold-down devise 40 is operable to allow only limited upward movement, the ramp 12 may pivot about the pin 14 as the loadbed 24 moves up and down within a limited range during cargo loading and unloading operations. The ramp 12 is free to move downward against the bias of the springs 36 as the ratchet mechanism provided by the pawl 54 and the bar 44 allow substantially unrestricted movement in the direction of the arrow 150. However, movement of the ramp 12 in a counterclockwise direction, viewing FIGS. 1 and 2, is limited by compression of the spring 72, which allows some movement of the pawl 54 and the body 56, including the tube 68, against the bias of the spring as the bar 44 moves in a direction opposite the direction of the arrow 150.

Since the retainer and release pin member 74 is connected to the rod 62 and does not move with the body 56 the hold-down device 40 undergoes only limited movement and allows only limited movement of the ramp 12 in a counterclockwise direction, viewing FIGS. 1 and 2. When the body 56 moves relative to the rod 62 and the retainer and release pin member 74 to a position where the release pins 78 engage the leg portions 107 and 109 of the actuator 104 to effect rotation of the release actuator 104 in a clockwise direction viewing FIG. 3, about the pivot pin 110, the pawl 54 is moved out of engagement with the ratchet bar 44 to allow the ramp to pivot further upwardly, viewing FIGS. 1 and 2.

The pawl 54 will be momentarily disengaged from the ratchet bar 44 until the spring 72 moves the body 56 back into engagement with the cushion member 64 whereupon the bias spring 120 will cause the pawl to be repositioned in engagement with the ratchet bar. If a substantial upward movement of the ramp 12 is required, due to engagement with the loadbed 24 or another object, the self releasing hold-down device 40 may repeatedly effect disengagement of the pawl 54 from the ratchet bar 44 as the body 56 moves with the ratchet bar until the release action is effected as described above.

Figure 8:
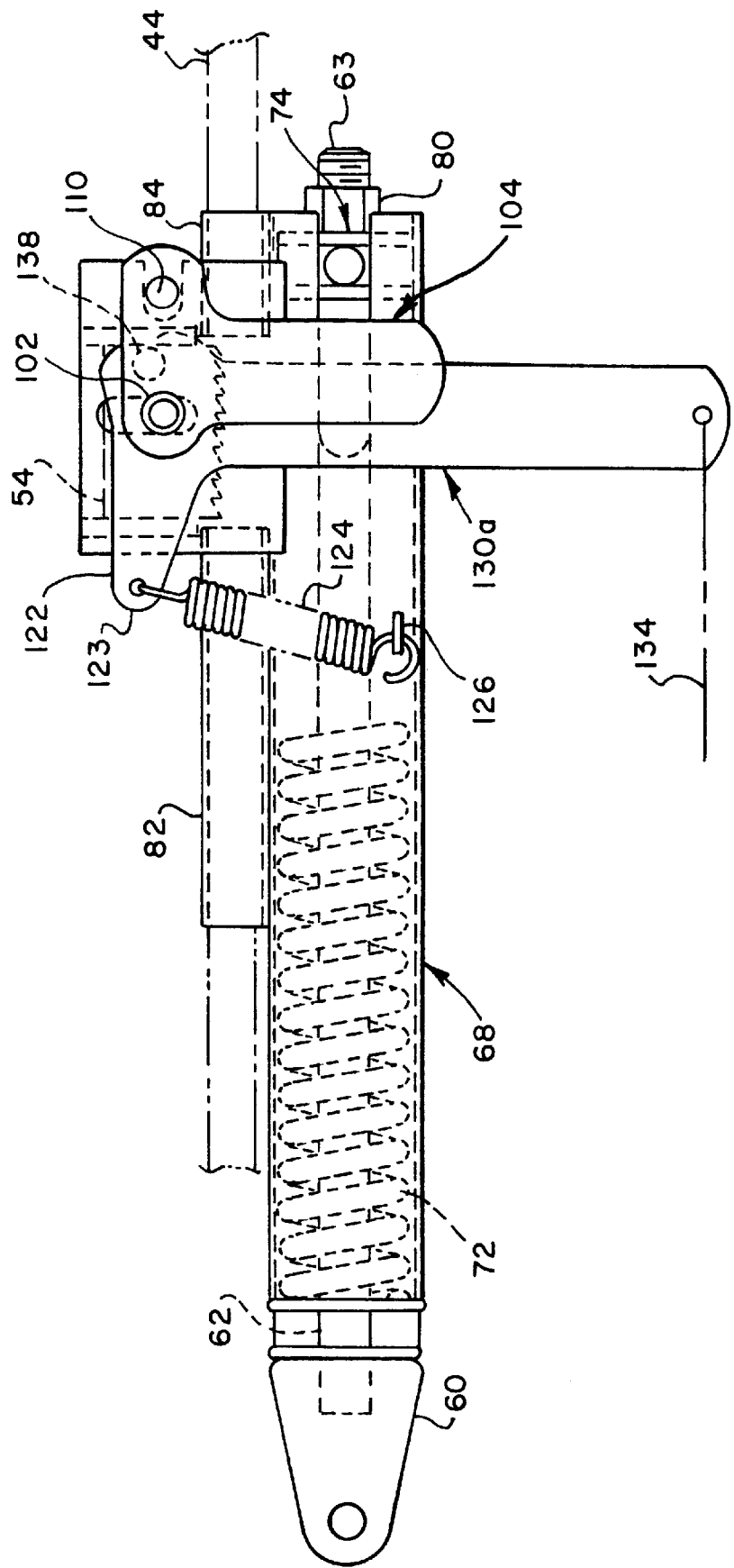
FIG. 8 is a side elevation of another embodiment of the invention including a modified release handle and bias spring arrangement.

Alternatively, as shown in FIG. 8, the device 40 may omit the spring 120 and include a modified release lever 130a in place of the lever 130. Lever 130a includes a laterally projecting branch part 122 connected at its distal end 123 to a coil spring 124. The opposite end of coil spring 124 is connected to a bracket 126 secured to the tube 68. The lever 130a is otherwise identical to lever 130 and is supported in the same manner on pins 102 and 138. Accordingly, when the release actuator 104 is rotated about the axis of pin 110 in a clockwise direction, viewing FIG. 8, this action is against the bias of the spring 124 and, once the pins 78 move out of engagement with the release actuator 104, the release actuator is biased back toward the position shown in FIG. 8.

The materials used for fabrication of the dock leveler 10 and the self releasing hold-down device 40, together with the fabrication thereof, is believed to be within the purview of one skilled in the art of such devices. Although preferred embodiments of the invention have been described in detail herein, those skilled in the art will further appreciate that various substitutions and modifications may be made to the invention without departing from the scope and spirit of the appended claims.

What is claimed is:

1. In a dock leveler including a ramp operable for movement between a stored position and a position in engagement with a roadbed, a self releasing hold-down device operable for normally holding said ramp against movement out of engagement with said loadbed but releasable under a predetermined force acting on said ramp, said hold-down device comprising:

an elongated ratchet bar including a plurality of spaced apart ratchet teeth formed thereon, said ratchet bar being connected at one end to said ramp for movement with said ramp;

a body disposed for limited movement with said ramp in response to a force exerted on said ramp by said loadbed, said body supporting a pawl engageable with said ratchet bar to permit movement of said ratchet bar relative to said pawl in one direction but to prevent movement of said ratchet bar relative to said pawl in an opposite direction;

a release actuator operable to effect disengagement of said pawl from said ratchet bar;

resilient biasing means engageable with said body for allowing said body and said pawl to move with said ratchet bar over a limited range of movement in response to a force acting on said ramp;

an anchor member connected to a frame for said dock leveler, said anchor member including an elongated rod; and release pin means mounted on said rod and engageable with said release actuator for moving said release actuator to a position to effect disengagement of said pawl from said ratchet bar in response to movement of said body with said ramp.

2. The invention set forth in claim 1 wherein:

said pawl includes a plurality of ratchet teeth formed thereon engageable with said ratchet teeth on said ratchet bar.

3. The invention set forth in claim 2 wherein:

said pawl is mounted for sliding movement in a recess formed in said body.

4. The invention set forth in claim 1 including:

resilient biasing means operably engageable with said pawl for urging said pawl into engagement with said ratchet bar.

5. The invention set forth in claim 4 wherein:

said resilient biasing means comprises a spring supported on said body and engaged with said pawl for urging said pawl into engagement with said ratchet bar.

6. The invention set forth in claim 4 wherein:

said hold-down device includes a lever mounted for pivotal movement on said body and operable to effect movement of said pawl to disengage from said ratchet bar; and said resilient biasing means comprises a spring connected to said lever and said body for urging said lever and said pawl toward a position of engagement of said pawl with said ratchet bar.

7. The invention set forth in claim 1 wherein:

said body includes a portion forming an elongated tube disposed in sleeved relationship around said rod, said biasing means comprises a coil spring disposed in said tube and engageable with said tube, said coil spring being operable to urge said body to move in one direction and said coil spring being operable to yield to movement of said body in an opposite direction in response to a force acting on said ramp.

8. The invention set forth in claim 1 wherein:

said release actuator includes a pivot pin connected to spaced apart members supported on said body by said pivot pin, a pawl actuating pin connected to said spaced apart members and said pawl and responsive to rotation of said release actuator about said pivot pin to move said pawl to disengage from said ratchet bar.

9. The invention set forth in claim 8 wherein:

said release pin means comprises opposed release pins engageable with said release actuator to effect pivotal movement of said release actuator about said pivot pin.

10. The invention set forth in claim 8 including:

a lever mounted on said body and operable at will to effect movement of said pawl to release from forcible engagement with said ratchet bar to allow movement of said ramp in a direction away from said loadbed.

11. The invention set forth in claim 10 wherein:

said lever is mounted for pivotal movement on said body and is engaged with said pawl actuating pin for moving said pawl actuating pin and said pawl to effect release from said ratchet bar.

12. The invention set forth in claim 8 including:

a spring connected to said release actuator and operable to bias said release actuator to rotate to a position to urge said pawl into engagement with said ratchet bar.

13. In a dock leveler including a ramp operable for movement between a stored position and a position in engagement with a loadbed, a self releasing hold-down device operable for normally holding said ramp against movement out of engagement with said loadbed but releasable under a predetermined force acting on said ramp, said hold-down device comprising:

an elongated ratchet member connected at one end to said ramp for movement with said ramp;

a body disposed for limited movement with said ramp in response to a force exerted on said ramp by said loadbed, said body supporting a pawl engageable with said ratchet member to permit movement of said ratchet member relative to said pawl in one direction but to prevent movement of said ratchet member relative to said pawl in an opposite direction;

a release actuator responsive to limited movement of said body with said ramp to effect disengagement of said pawl from said ratchet member;

an anchor member connected to a frame for said dock leveler, said anchor member including an elongated rod having a threaded distal end;

said body includes a portion forming a tube disposed in sleeved relationship around said rod;

a coil spring disposed in said tube and engageable with said tube; and a pawl release member mounted in said tube, said pawl release member being retained on said rod by an adjustment nut threadedly engaged with said threaded distal end of said rod, said pawl release member being operable to engage said release actuator in response to limited movement of said body with respect to said rod to effect disengagement of said pawl from said ratchet member.

14. In dock leveler including a ramp operable for movement between a stored position and a position in engagement with a loadbed, a self releasing hold-down device operable for normally holding said ramp against movement out of engagement with said loadbed but releasable under a predetermined force acting on said ramp, said hold-down device comprising:

an elongated ratchet member connected at one end to said ramp for movement with said ramp;

a body disposed for limited movement with said ramp in response to a force exerted on said ramp by said loadbed, said body supporting a pawl engageable with said ratchet member to permit movement of said ratchet member relative to said pawl in one direction but to prevent movement of said ratchet member relative to said pawl in an opposite direction;

a release actuator disposed on said body and responsive to limited movement of said body with said ramp to effect disengagement of said pawl from said ratchet member;

an elongated anchor member connected to a frame for said dock leveler and disposed adjacent to said body; and a pawl release member supported on said anchor member and normally disengaged from said release actuator, said pawl release member being operable to engage said release actuator in response to limited movement of said body with respect to said anchor member to effect disengagement of said pawl from said ratchet member.

* * * * *